(12) United States Patent
He et al.

(10) Patent No.: US 8,934,168 B2
(45) Date of Patent: Jan. 13, 2015

(54) METHOD AND APPARATUS FOR AMPLIFYING AND DYNAMICALLY ADJUSTING OPTICAL SIGNAL

(75) Inventors: Zian He, Shenzhen (CN); Jie Su, Shenzhen (CN); Songlin Zhu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 178 days.

(21) Appl. No.: 13/497,911

(22) PCT Filed: Apr. 23, 2010

(86) PCT No.: PCT/CN2010/072122
§ 371 (c)(1),
(2), (4) Date: Mar. 23, 2012

(87) PCT Pub. No.: WO2010/145325
PCT Pub. Date: Dec. 23, 2010

(65) Prior Publication Data
US 2012/0176667 A1    Jul. 12, 2012

(30) Foreign Application Priority Data
Sep. 25, 2009    (CN) .......................... 2009 1 0093161

(51) Int. Cl.
*H01S 5/00*    (2006.01)
*H04B 10/294*    (2013.01)
*H04B 10/12*    (2006.01)

(52) U.S. Cl.
CPC .................................. *H04B 10/2942* (2013.01)
USPC ....................................................... 359/344

(58) Field of Classification Search
USPC ....................................................... 359/344
See application file for complete search history.

(56) References Cited

U.S. PATENT DOCUMENTS

| 2004/0136055 A1* | 7/2004 | Michie et al. ............ 359/337.11 |
| 2007/0297044 A1* | 12/2007 | Qiao et al. ..................... 359/337 |

(Continued)

FOREIGN PATENT DOCUMENTS

| CN | 1574712 A | 2/2005 |
| CN | 101253713 A | 8/2008 |
| KR | 20010056290 A | 7/2001 |

OTHER PUBLICATIONS

Craig Michie et al. ,"Automatic power control with electronic amplified spontaneous emission compensation", Optical Engineering, vol. 46, Issue 8, 080501-(1-3), Aug. 2007.*

(Continued)

*Primary Examiner* — Eric Bolda
(74) *Attorney, Agent, or Firm* — Stephen Yang; Ling Wu; Ling and Yang Intellectual Property

(57) ABSTRACT

A method for amplifying and dynamically adjusting an optical signal is provided in the present invention, which includes: a first optical tap splitting out a small part of the optical signal, which is converted into an electric signal via a first optical detector and is then output to a high speed gain control circuit, in proportion from an uplink burst optical signal, and outputting a remainder of the optical signal to an optical amplifier; the high speed gain control circuit dynamically adjusting the control signal loaded on the optical amplifier according to the input electric signal which varies with uplink burst slots; and the optical amplifier dynamically adjusting a gain value according to the loaded control signal to make peak powers of the output uplink optical signals in different burst slots equal, thus achieving output power equalization.

4 Claims, 6 Drawing Sheets

(56) References Cited

U.S. PATENT DOCUMENTS

2010/0266293 A1* 10/2010 Sone et al. .................... 398/175
2010/0321768 A1* 12/2010 Sone ............................. 359/337
2011/0164310 A1* 7/2011 Tanaka et al. ................. 359/344

OTHER PUBLICATIONS

International Search Report for PCT/CN2010/072122 dated Jul. 9, 2010.

* cited by examiner

METHOD AND APPARATUS FOR AMPLIFYING AND DYNAMICALLY ADJUSTING OPTICAL SIGNAL

TECHNICAL FIELD

The present invention relates to the field of optical access network communications, and in particular, to a method and apparatus for amplifying and dynamically adjusting an optical signal in a long-distance passive optical network.

BACKGROUND OF THE RELATED ART

The Passive Optical Network (PON) technology with the advantages of low-cost, multi-user access, ultra-long distance transmission, high transmission bandwidth etc., has gradually replaced the existing cable access network with the copper wire as a transmission medium, and becomes the mainstream broadband access network technology. At present, there are mainly two PON technologies, i.e., the Ethernet Passive Optical Network (EPON) and the Gigabit-Capable Passive Optical Network (GPON). Generally, the coverage of both PONs is 20 km, and the maximum branching ratio is 1:64 or 1:128. The maximum transmission distance and the splitting ratio are mainly limited by optical power budget of the PON network, while the optical power budget is mainly determined by two aspects: output power of an optical transmitter and sensitivity of the optical receiver used in an Optical Line Terminal (OLT) and an Optical Network Unit (ONU), which are determined by the existing technological level of the optical transceiver.

With the continuous increasing of the broadband access users, as well as the continuous expansion of the broadband service coverage rate, the next-generation PON has explicitly put forward requirements to extend the transmission distance and increase the branching ratio. This can significantly reduce the number of network nodes and reduce the cost of network deployment and maintenance. To achieve this purpose, the most simple and feasible method is to add a relay amplifier in a backbone fiber of an Optical Distribution Network (ODN), which has been explicitly pointed out in related standards of the next-generation PON.

The downlink signal of the PON is in a continuous mode, and the uplink signal uses a Time Division Multiplexing Address (TDMA) mode. Because the distances for uplink signals sent by different ONUs to reach the OLT are different, and the transmission optical powers per se between different ONUs are different, the power levels received by the OLT are different in various slots, which is referred to as "far-near problem", and the existing standard stipulates that the maximum of the difference between uplink optical powers of different ONUs can be permitted to reach 15 dB. In order to receive bit streams correctly, the OLT receiver must adjust the decision level at the beginning of each burst slot, and such mechanism is referred to as Automatic Gain Control (AGC). The AGC time of the burst receiving module at the OLT side which is stipulated by the standard is very short, for example, the GPON stipulates that only 44 bits (less than 36 ns) are used for the AGC and clock synchronization. In most cases, the signal dynamic range of different ONUs needs longer AGC adjustment time than the stipulated time. And the next generation PON network with a higher rate will require shorter AGC time, and therefore, this problem will be more obvious. In order to reduce the gain adjustment range, the GPON suggests to use a power adjustment mechanism, i.e., the OLT indicates the ONU to adjust the power to make the powers of various ONUs reaching the OLT approximately equal. Although requirements on the AGC adjustment range of the OLT receiver are relaxed through the adjustment mechanism, this makes the ONU hardware more complex, and it is needed to add related control protocols between the OLT and the ONU.

In addition, future PONs will develop to a long-distance, multi-wavelength multiplexing direction. Related standards of the next generation PON have been proposed to add a reach extender unit on a trunk fiber link for converting the wavelength of an optical signal. Another use of the optical amplifier is as a pre-amplifier of a wavelength converter, while All Optical Wavelength Converter (AOWC) generally requires the input optical power to be within a certain range, which is referred to as a linear working area. If the input optical power exceeds the range, the waveform of the output optical signal will be distorted, or degrade the output extinction ratio, and therefore, when such type of optical device is applied in the uplink, the power difference between the uplink burst signals in different slots is also desired to be as small as possible.

SUMMARY OF THE INVENTION

In view of this, the main purpose of the present invention is to provide a method and apparatus for amplifying and dynamically adjusting an optical signal, so as to implement amplification and output power equalization on uplink burst signals of different ONUs, and reduce an AGC adjustment range at the OLT side.

In order to achieve the above purpose, the technical scheme of the present invention is implemented as follows.

The present invention provides a method for amplifying and dynamically adjusting an optical signal, comprising:

a first optical tap splitting out a small part of the optical signal, which is converted into an electric signal via a first optical detector and is then output to a high speed gain control circuit, in proportion from an uplink burst optical signal, and outputting a remainder of the optical signal to an optical amplifier, wherein, the optical amplifier is a Semiconductor Optical Amplifier (SOA), an operation mode is an Automatic Power Control (APC) mode, and the APC operation mode can implement a high speed response to a burst signal;

the high speed gain control circuit dynamically adjusting a control signal loaded on the optical amplifier according to an input electric signal which varies with uplink burst slots;

the optical amplifier dynamically adjusting a gain value according to the loaded control signal in order to make peak powers of output uplink optical signals in different burst slots equal, thus achieving output power equalization.

The method further comprises performing feedback control on the optical signals output by the optical amplifier, which specifically is:

a second optical tap receiving the optical signal output by the optical amplifier, splitting out a small part of the optical signal, which is converted into an electric signal via a second optical detector and is then output to the high speed gain control circuit, in a same proportion as that of the first optical tap from the optical signal;

the high speed gain control circuit performing APC control according to a relative size of the electric signal output by the first optical detector and the electric signal output by the second optical detector to dynamically adjust the control signal loaded on the optical amplifier.

The method further comprises the high speed gain control circuit performing Amplified Spontaneous Emission (ASE) pre-compensation on the output control signal.

The proportion is less than 5%.

The present invention further provides a method for amplifying and dynamically adjusting an optical signal, comprising:

a first optical tap splitting out a small part of the optical signal, which is converted into an electric signal via a first optical detector and is then output to a gain control circuit and a high speed Variable Optical Attenuator (VOA) control circuit, and outputting a remainder of the optical signal to an optical amplifier, wherein, the optical amplifier is a rare earth doped fiber amplifier, and an operation mode is an Automatic Gain Control (AGC) mode;

the high speed VOA control circuit dynamically adjusting a control signal loaded on a high speed VOA according to an input electric signal which varies with uplink burst slots;

the high speed VOA dynamically adjusting an attenuation value according to the loaded control signal in order to make peak powers of output uplink optical signals in different burst slots equal, thus achieving output power equalization.

The method further comprises performing feedback control on the optical signal output by the optical amplifier, which specifically is:

a second optical tap receiving the optical signal output by the optical amplifier, splitting out a small part of the optical signal, which is converted into an electric signal via a second optical detector and is then output to the high speed gain control circuit, in a same proportion as that of the first optical tap from the optical signal; the gain control circuit performing AGC control according to a relative size of the electric signal output by the first optical detector and the electric signal output by the second optical detector to dynamically adjust the control signal loaded on the optical amplifier;

the optical amplifier dynamically adjusting a gain size according to the control signal output by the gain control circuit.

The method further comprises the gain control circuit performing ASE pre-compensation on the output control signal.

The method further comprises the high speed VOA dynamically adjusting the attenuation values of the uplink optical signals in different slots at an output terminal of the second optical tap.

The method further comprises the high speed VOA dynamically adjusting the attenuation values of the uplink optical signals in different slots before the optical amplifier.

The method further comprises the second optical detector converting the detected burst optical signal which has a waveform distortion after being amplified into a corresponding proportion of electric signal and outputting the corresponding proportion of electric signal to the high speed VOA control circuit, and the high speed VOA control circuit dynamically adjusting the control signal loaded on the high speed VOA according to the input electric signal which varies with uplink burst slots, so as to make the waveform distortion of the burst signal after being amplified reduce.

The proportion is less than 5%.

The present invention further provides an apparatus for amplifying and dynamically adjusting an optical signal, comprising: a first optical tap, a first optical detector, a high speed gain control circuit and an optical amplifier, wherein, the optical amplifier is a SOA, and an operation mode is an APC mode;

the first optical tap is configured to split out a small part of the optical signal in proportion from an uplink burst optical signal, output the small part of the optical signal to the first optical detector and output a remainder of the optical signal to an optical amplifier;

the first optical detector is configured to convert the input optical signal in an uplink burst slot into a corresponding electric signal and then output the electric signal to the high speed gain control circuit;

the high speed gain control circuit is configured to dynamically adjust the control signal loaded on the optical amplifier according to the input electric signal which varies with uplink burst slots; and the optical amplifier is configured to dynamically adjust a gain value according to the loaded control signal in order to make peak powers of the output uplink optical signals in different burst slots equal, thus achieving output power equalization.

The apparatus further comprises a second optical tap and a second optical detector, wherein, the second optical tap is configured to receive the optical signal output by the optical amplifier, and split out a small part of the optical signal in the same proportion as that of the first optical tap from the optical signal, and output the small part of the optical signal to the second optical detector; and the second optical detector is configured to convert the input optical signal into an electric signal and output the electric signal to the high speed gain control circuit;

correspondingly, the high speed gain control circuit is further configured to perform APC control according to a relative size of the electric signals output by the first optical detector and the second optical detector to dynamically adjust the control signal loaded on the optical amplifier.

The optical amplifier further comprises a gain flatten filter, which is configured to flatten gains of the input optical signals with different wavelengths.

The present invention further provides an apparatus for amplifying and dynamically adjusting an optical signal, comprising: a first optical tap, a first optical detector, a gain control circuit, an optical amplifier, a high speed VOA control circuit and a high speed VOA, wherein, the optical amplifier is a rare earth doped fiber amplifier, and an operation mode is an AGC mode;

the first optical tap is configured to split out a small part of the optical signal in proportion from an uplink burst optical signal, output the small part of the optical signal to the first optical detector, and output a remainder of the optical signal to the optical amplifier;

the first optical detector is configured to convert the input optical signal in an uplink burst slot into a corresponding electric signal and then output the electric signal to the gain control circuit, or output the electric signal to the gain control circuit and the high speed VOA control circuit;

the gain control circuit is configured to perform AGC gain control on the optical amplifier;

the high speed VOA control circuit is configured to dynamically adjust the control signal loaded on the high speed VOA according to the input electric signal which varies with uplink burst slots; and the high speed VOA is configured to dynamically adjust an attenuation value according to the loaded control signal, and control the uplink optical signals in different slots, to achieve output power equalization.

The apparatus further comprises a second optical tap and a second optical detector, wherein, the second optical tap is configured to receive the optical signal output by the optical amplifier, and split out a small part of the optical signal in the same proportion as that of the first optical tap from the optical signal, and output the small part of the optical signal to the second optical detector; and the second optical detector is configured to convert the input optical signal into an electric signal and then output the electric signal to the gain control circuit;

correspondingly, the gain control circuit is configured to perform AGC control according to a relative size of the electric signals output by the first optical detector and the second optical detector to dynamically adjust the control signal loaded on the optical amplifier;

the optical amplifier dynamically adjusts a gain size according to the control signal output by the gain control circuit.

The optical amplifier further comprises a gain flatten filter, which is configured to flatten gains of the input optical signals with different wavelengths.

The second optical detector converts the detected optical signal which has a waveform distortion after being amplified into a corresponding proportion of electric signal and outputs the electric signal to the high speed VOA control circuit, and the high speed VOA control circuit dynamically adjusts the control signal loaded on the high speed VOA according to the input electric signal which varies with uplink burst slots, so as to make the waveform distortion of the burst signal after being amplified reduce.

The high speed VOA is located at an input end of the optical amplifier or an output end of the second optical tap.

The method and apparatus for amplifying and dynamically adjusting an uplink optical signal in a PON network provided by the present invention implement amplification and output power equalization on uplink burst optical signals of different ONUs through dynamically adjusting a control signal loaded on an optical amplifier by a gain control circuit according to real-time detection results of the uplink signal in a trunk fiber link, which can effectively reduce an AGC adjustment range at an OLT side, reduce the complexity of the ONU and the OLT devices, and can also make the input optical power of the wavelength converter always remain within the linear working area.

PREFERRED EMBODIMENTS OF THE PRESENT INVENTION

The technical scheme will be further described in detail in conjunction with accompanying drawings and specific embodiments hereinafter.

If a relay amplifier used in an uplink of a long-distance PON can make output power of uplink burst optical signals in different slots equal while amplifying the signals, i.e., making peak powers of the uplink burst optical signals in different slots received by the OLT close or equal, which can significantly reduce the technical difficulty of the OLT gain adjustment without adding an additional output power adjustment module within the ONU, and significantly reduce the cost of the device.

As the downlink signals of the current PON and the next generation PON (10G-EPON and NG-EPON) are planned respectively in the S band (approximately 1490 nm) and L band (approximately 1580 nm). The L band belongs to the gain wavelength range of an Erbium Doped Fiber Amplifier (EDFA), so the use of EDFA is more appropriate; the amplification in S band needs to use a Semiconductor Optical Amplifier (SOA) corresponding to a gain bandwidth. As the uplink signals of the current PON and the next generation PON (10G-EPON and NG-EPON) are planned respectively in the O band (1260 nm-1360 nm) and O-band (1260 nm-1280 nm), a SOA or a Praseodymium Doped Fiber Amplifier (PDFA) in such band can be used. Of course, the present invention does not limit the type of the optical amplifier, and an all optical amplifier of the corresponding band should be used if the uplink wavelength is shifted to other bands (such as C band) with the development of the PON technology.

For the uplink optical signals of the PON, as the form of time division multiplexing is used, it is a burst mode in the time-domain. The SOA belongs to a fast response optical device, and can synchronously responds to the optical signals in the burst mode, while the rare earth doped fiber amplifier belongs to a slow response device, and cannot change a gain size in real time according to the change of the burst signals. Therefore, different control methods are required to be used when the two optical amplifiers are used to amplify the optical signals in the uplink burst mode.

Figure 1:
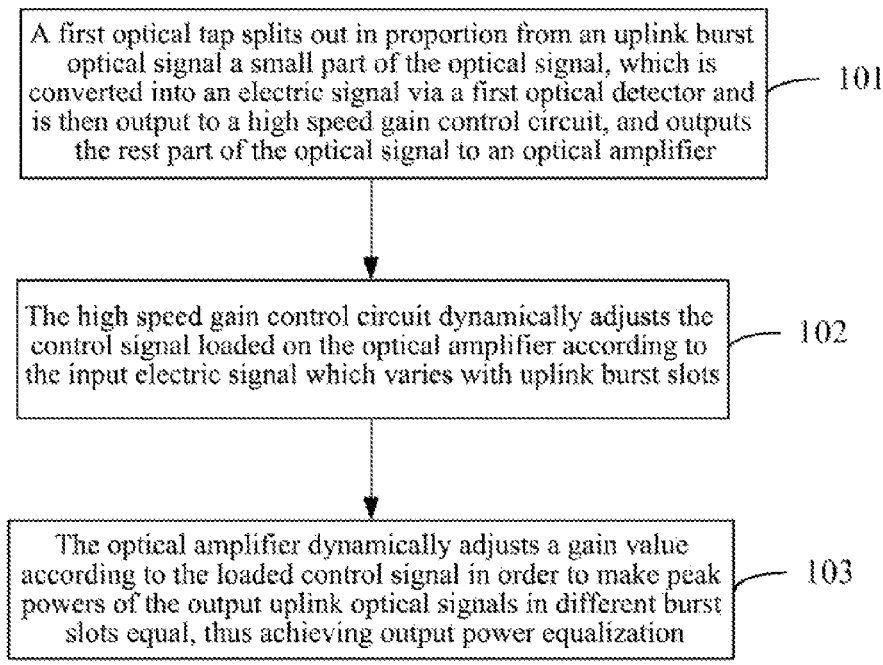
FIG. 1 is flowchart one of a method for amplifying and dynamically adjusting an optical signal according to the present invention.

Based on the above idea, if the amplifier used is the SOA, a corresponding method for amplifying and dynamically adjusting an optical signal provided by the present invention, as shown in FIG. 1, mainly comprises the following steps.

In Step 101, a first optical tap splits out a small part of the optical signal, which is converted into an electric signal via a first optical detector and is then output to a high speed gain control circuit, in proportion from an uplink burst optical signal, and outputs the remainder of the optical signal to an optical amplifier (i.e., SOA). Wherein, the operation mode of the SOA is Automatic Power Control (APC). The APC operation mode can implement high speed response to the change of the peak power of the uplink burst signal, so as to implement output power equalization of the uplink optical signals amplified by the SOA in different burst slots.

After the uplink burst optical signal from the ONU enters the first optical tap, the optical signal is divided into two parts, wherein, a small part of the optical signal is sent to the first optical detector, and an electric signal obtained by the first optical detector through photoelectric translating is output to a high speed gain control circuit. The rest part of the optical signal is output to the optical amplifier by the first optical tap. The proportion is determined according to the actual condition, and is usually less than 5%.

In Step 102, the high speed gain control circuit dynamically adjusts the control signal loaded on the optical amplifier according to the input electric signal which varies with uplink burst slots.

As the photoelectric conversion and the gain control adjustment need a certain time, in order to ensure the control signal loaded by the gain control circuit and the optical signal output by the first optical tap simultaneously reach the optical amplifier, a section of delay fiber can be set between the first optical tap and the optical amplifier in the present invention, to make the optical signal output by the first optical tap be input into the optical amplifier after being transmitted through the section of delay fiber, so as to enable flexibly adjusting the length of the delay fiber, and ensure the control signal loaded by the gain control circuit and the optical signal output by the first optical tap simultaneously reach the optical amplifier, thus implementing the synchronization adjustment.

In Step 103, the optical amplifier dynamically adjusts a gain value according to the loaded control signal in order to make peak powers of the output uplink optical signals in different burst slots equal, thus achieving output power equalization.

In order to make the peak optical powers of the uplink burst optical signals amplified by the optical amplifier always remain at a suitable size, the present invention further needs to perform feedback control on the optical signals output by the optical amplifier, which specifically comprises the following steps.

A second optical tap receives the optical signal output by the optical amplifier, splits a small part of the optical signal in the same proportion as that of the first optical tap from the optical signal, converts the small part of the optical signal into an electric signal via a second optical detector and then outputs the electric signal to the gain control circuit; and the gain control circuit performs APC control according to a relative size of the electric signals output by the first optical detector and the second optical detector to dynamically adjusts the control signal loaded on the optical amplifier.

In addition, as the an Amplified Spontaneous Emission (ASE) will be introduced in the output optical signal after the optical signal passes through the optical amplifier, and the second optical detector cannot identify the signal and the ASE, there will be a certain difference between an actual gain value or an output optical power of the optical amplifier and a predetermined value, and therefore, the difference needs to be compensated. A solution is to add a band pass filter before the second optical detector; however, as it is stipulated in the PON that the uplink burst optical signals sent by the ONU are permitted to have a certain wavelength range (tens to one hundred nanometers), the band pass filter is ineffective. Another solution is to add an ASE pre-compensation function in the gain control circuit, i.e., pre-setting ASE compensation values to which each group of input and output signals correspond in the gain control circuit, and performing corresponding adjustment according to the corresponding ASE compensation values when performing the gain control.

As in the actual PON system, the uplink optical signals sent by the ONU are permitted to have a certain wavelength range (tens to one hundred nanometers) and the amplification abilities of the optical amplifier for the incident optical signals with different wavelengths are proportional to the ASE size of the wavelength, in order to make the gain for the incident optical signals with different wavelengths in the range by the optical amplifier be the same, a Gain Flatten Filter (GFF) is required to be added in the optical amplifier.

Corresponding to the method for amplifying and dynamically adjusting an optical signal illustrated in FIG. 1, an apparatus for amplifying and dynamically adjusting an optical signal provided by the present invention comprises a first optical tap, a first optical detector, a high speed gain control circuit and an optical amplifier, wherein, the optical amplifier is a SOA, and an operation mode is an APC mode; the first optical tap is configured to split out a small part of the optical signal in proportion from an uplink burst optical signal to the first optical detector and output the rest part of the optical signal to an optical amplifier. The first optical detector is configured to convert the input optical signals in the uplink burst slots into a corresponding electric signal and then output the electric signal to the high speed gain control circuit. The high speed gain control circuit is configured to dynamically adjust the control signal loaded on the optical amplifier according to the input electric signal which varies with uplink burst slots. The optical amplifier is configured to dynamically adjust a gain value according to the loaded control signal in order to make peak powers of the output uplink optical signals in different burst slots equal, thus achieving output power equalization.

The apparatus further comprises a second optical tap and a second optical detector. The second optical tap is configured to receive the optical signal output by the optical amplifier, and split out a small part of the optical signal in the same proportion as that of the first optical tap from the optical signal, and output the small part of the optical signal to the second optical detector. The second optical detector is configured to convert the input optical signal into an electric signal and output the electric signal to the high speed gain control circuit. Correspondingly, the high speed gain control circuit is further configured to perform APC control according to a relative size of the electric signals output by the first optical detector and the second optical detector to dynamically adjust the control signal loaded on the optical amplifier.

Figure 2:
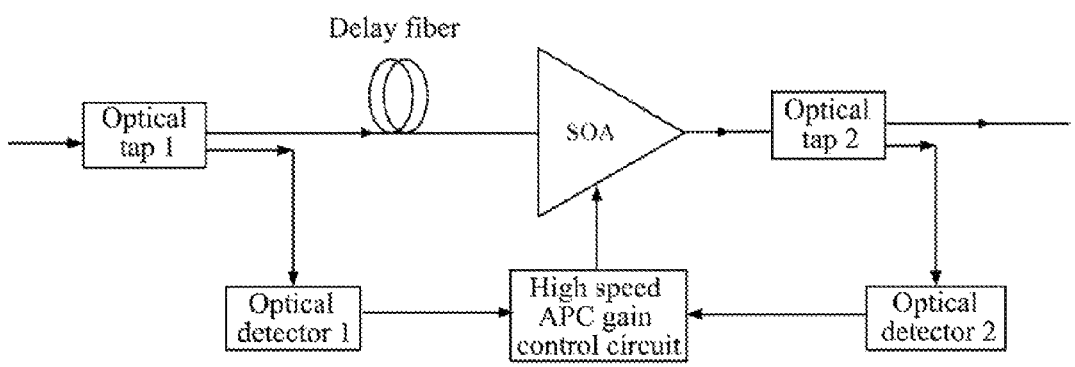
FIG. 2 is structural diagram of a composition of an apparatus for amplifying and dynamically adjusting an optical signal according to example one of the present invention.

The operational principle of the above apparatus for amplifying and dynamically adjusting an optical signal will be described in conjunction with FIG. 2 hereinafter. As shown in FIG. 2, in the apparatus for amplifying and dynamically adjusting an optical signal according to example one of the present invention, the uplink burst optical signals sent by a plurality of ONUs first pass through an optical tap 1 (i.e., the first optical tap) and a small part of the optical signals are split out in proportion and then output to an optical detector 1 (i.e., the first optical detector), and the remainder of the optical signals reach an input terminal of the SOA after passing through a section of delay fiber. The optical detector 1 outputs obtained electric signals to a gain control circuit after photoelectrical conversion. The gain control circuit dynamically adjusts a pumping current loaded on the SOA according to the input electric signals, so as to perform synchronization gain adjustment on the uplink burst optical signals.

Figure 3:
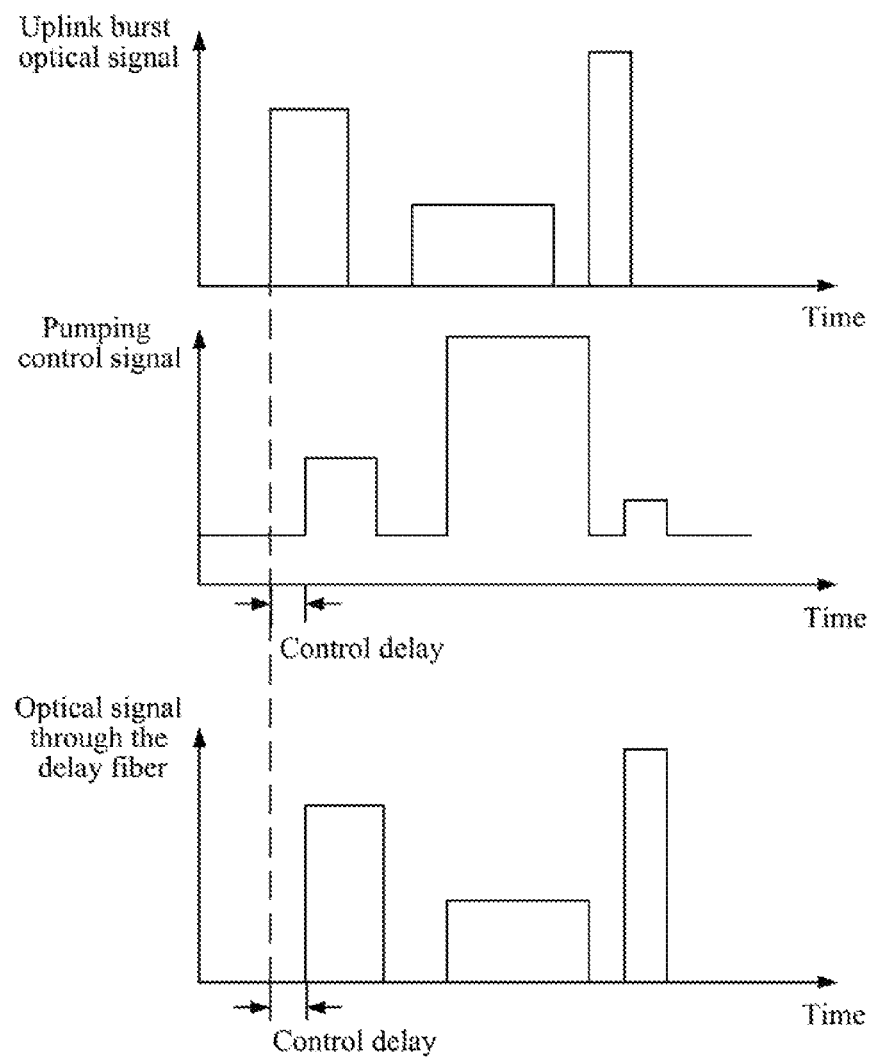
FIG. 3 is a sequential diagram of synchronization adjustment through a delay fiber according to example one of the present invention.

As the photoelectrical conversion and the gain control adjustment need a period of time, the remainder of the optical signals after the optical tap 1 is input into SOA after passing through a section of delay fiber and adjusting the length of the delay fiber can ensure the bumping control signal corresponding to the remainder of the optical signal can reach the SOA at the same time so as to implement the synchronization adjustment. The sequential chart of the synchronization adjustment is shown in FIG. 3, wherein, the uplink burst optical signals from the ONU generate a control delay after passing through a section of delay fiber, so as to make the optical signals and the bumping control signal synchronically reach the SOA.

In addition, in order to make the peak optical power of the uplink burst optical signal after being amplified by the SOA reach a suitable value, feedback control also needs to be performed on the optical signal output by the SOA. An optical tap 2 (i.e., the second optical tap) is added at an output terminal of the SOA, to split a small part of the optical signal in the same proportion as that of the optical tap 1 into an optical detector 2 (i.e., the second optical detector), convert the part of the optical signal into an electric signal and then input the electric signal into a gain control circuit. As the SOA belongs to a high speed response optical device, the gain size of the SOA can be changed in real time only by synchronously changing the pumping control signal loaded on the SOA simply according to the peak power change of the uplink burst optical signals, so as to make the peak power of the burst optical signals output by the SOA not change with the change of the peak power of the input burst optical signals. The gain control circuit uses the APC operation mode, and the SOA is controlled to amplify all the input burst optical signals with different peak optical power sizes to the same peak power level.

As the ASE will be introduced in the output optical signal after the SOA is passed while the optical detector 2 cannot identify the signal and the ASE, there will be a certain difference between an actual gain value or an output optical power of the optical amplifier and a predetermined value. In order to compensate the difference, the example one of the present invention adds an ASE pre-compensation function in the gain control circuit, i.e., pre-setting ASE compensation values to which each group of input and output signals correspond in the gain control circuit, and performing corresponding adjustment according to the corresponding ASE compensation values when performing the gain control.

As in the actual PON system, the uplink optical signals sent by the ONU are permitted to have a certain wavelength range (tens to one hundred nanometers) and the amplification abilities of the optical amplifier for the incident optical signals with different wavelengths are proportional to the ASE size of the wavelength, a GFF is required to be added in the optical amplifier so that the gains for the incident optical signals with different wavelengths in the range by the optical amplifier are the same.

Figure 4:
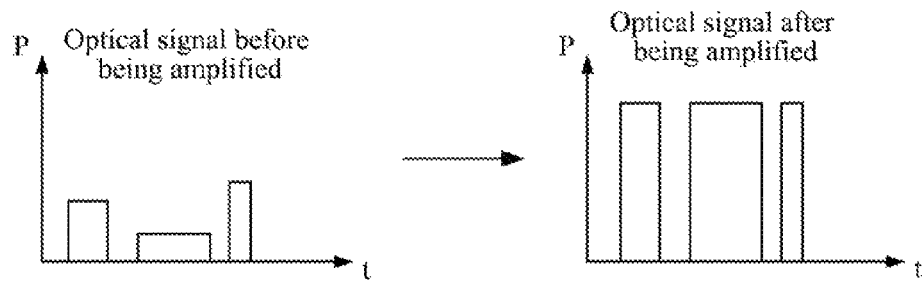
FIG. 4 is a sequential diagram of dynamical adjustment according to example one of the present invention.

In a sequential chart of dynamical adjustment corresponding to example one of the present invention, as shown in FIG. 4, the uplink burst optical signals after being amplified implement output power equalization of different burst slots when compared with the uplink burst optical signals before being amplified.

Figure 5:
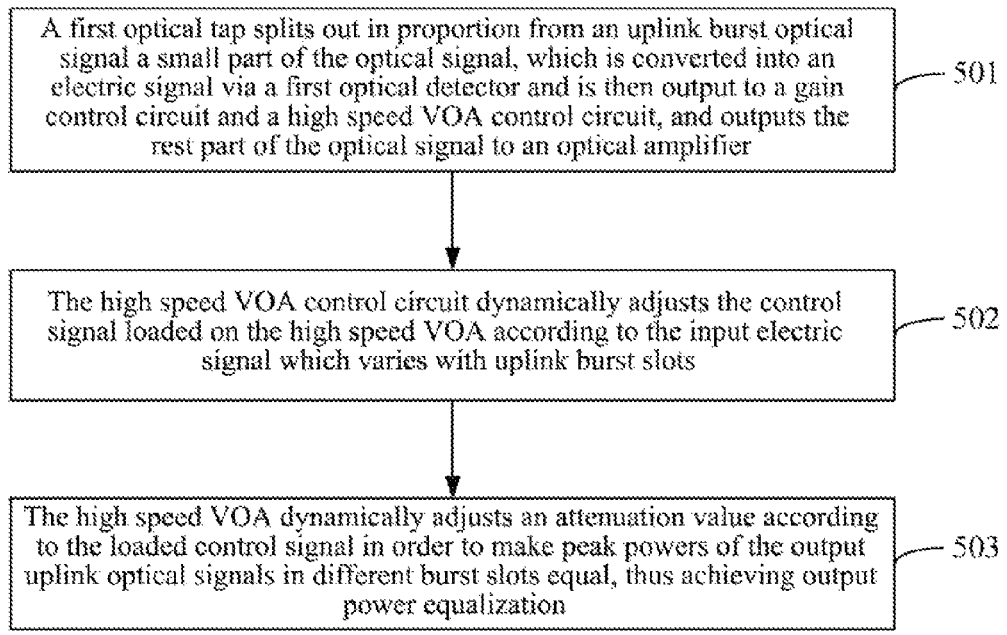
FIG. 5 is flowchart two of a method for amplifying and dynamically adjusting an optical signal according to the present invention.

If the amplifier to be used is a rare earth doped fiber amplifier (such as EDFA, PDFA, etc.), a corresponding method for amplifying and dynamically adjusting an optical signal provided by the present invention, as shown in FIG. 5, mainly comprises the following steps.

In Step 501, a first optical tap splits out a small part of the optical signal, which is converted into an electric signal via a first optical detector and is then output to a gain control circuit and a high speed Variable Optical Attenuator (VOA) control circuit, in proportion from an uplink burst optical signal, and outputs the remainder of the optical signal to an optical amplifier. An operation mode of the optical amplifier is an AGC mode. The proportion is determined according to actual conditions, and usually is less than 5%.

In Step 502, the high speed VOA control circuit dynamically adjusts the control signal loaded on the high speed VOA according to the input electric signal which varies with uplink burst slots.

In Step 503, the high speed VOA dynamically adjusts an attenuation value according to the loaded control signal in order to make peak powers of the output uplink optical signals in different burst slots equal, thus achieving output power equalization.

As the photoelectric conversion and the gain control adjustment need a certain time, in order to ensure the control signal loaded by the gain control circuit and the optical signal output by the first optical tap simultaneously reach the optical amplifier, a section of delay fiber can be set between the first optical tap and the optical amplifier in the present invention, to make the optical signal output by the first optical tap be input into the optical amplifier after being transmitted through the section of delay fiber, so as to enable flexibly adjusting the length of the delay fiber, and ensure the control signal loaded by the gain control circuit and the optical signal output by the first optical tap reach the optical amplifier thus implementing the synchronization adjustment.

Further, in order to make the peak powers of the uplink burst output signals amplified by the optical amplifier always remain at a suitable size, the present invention further needs to perform feedback control on the optical signals output by the optical amplifier, which specifically comprises the following steps. A second optical tap receives the optical signal output by the optical amplifier, splits out a small part of the optical signal in the same proportion as that of the first optical tap from the optical signal, the small part of the optical signal is converted into an electric signal via a second optical detector and then output to the gain control circuit; and the gain control circuit performs AGC control according to a relative size of the electric signals output by the first optical detector and the second optical detector to dynamically adjust the control signal loaded on the optical amplifier. The optical amplifier dynamically adjusts the gain size according to the control signal output by the gain control circuit, so as to make the peak optical power of the output uplink burst optical signal always remain at a suitable size.

In addition, as the ASE will be introduced in the output optical signal after passing through the optical amplifier while the optical detector 2 cannot identify the signal and the ASE, there will be a certain difference between an actual gain value or an output optical power of the optical amplifier and a predetermined value, and therefore, the difference needs to be compensated. A solution is to add a band pass filter before the second optical detector; however, as it is stipulated in the PON that the uplink burst optical signals sent by the ONU are permitted to have a certain wavelength range (tens to one hundred nanometers), the band pass filter is ineffective. Another solution is to add an ASE pre-compensation function in the gain control circuit, i.e., pre-setting ASE compensation values to which each group of input and output signals correspond in the gain control circuit, and performing corresponding adjustment according to the corresponding ASE compensation values when performing the gain control.

As in the actual PON system, the uplink optical signals sent by the ONU are permitted to have a certain wavelength range (tens to one hundred nanometers) and the amplification abilities of the optical amplifier for the incident optical signals with different wavelengths are proportional to the ASE size of the wavelength, in order to make the gain for the input optical signals with different wavelengths in the range by the optical amplifier be the same, a GFF is required to be added in the optical amplifier.

Corresponding to the method for amplifying and dynamically adjusting an optical signal illustrated in FIG. 5, an apparatus for amplifying and dynamically adjusting an optical signal provided by the present invention comprises a first optical tap, a first optical detector, a gain control circuit, an optical amplifier, a high speed VOA control circuit and a high speed VOA, wherein, the optical amplifier is a rare earth doped fiber amplifier, and an operation mode is a AGC mode. The first optical tap is configured to split out a small part of the optical signal in proportion from an uplink burst optical signal to the first optical detector, and output the remainder of the optical signal to the optical amplifier. The first optical detector is configured to convert the input optical signals in the uplink burst slots into corresponding electric signals and then output the electric signals to the gain control circuit and the high speed VOA control circuit. The gain control circuit is configured to perform gain control on the optical amplifier. The high speed VOA control circuit is configured to dynamically adjust the control signal loaded on the high speed VOA according to the input electric signal which varies with uplink burst slots. The high speed VOA is configured to dynamically adjust an attenuation value according to the loaded control signal, and control the uplink optical signals in different burst slots, thus achieving output power equalization.

The apparatus further comprises a second optical tap and a second optical detector. The second optical tap is configured to receive the optical signal output by the optical amplifier, and split out a small part of the optical signal in the same proportion as that of the first optical tap from the optical signal, and output the small part of optical signal to the second optical detector. The second optical detector is configured to convert the input optical signal into an electric signal and output the electric signal to the gain control circuit. Correspondingly, the gain control circuit is configured to perform AGC control according to a relative size of the electric signals output by the first optical detector and the second optical detector to dynamically adjust the control signal loaded on the optical amplifier. The optical amplifier dynamically adjusts the gain size according to the control signal output by the gain control circuit, so as to make the peak optical power of the output uplink burst optical signals always remain at a suitable size.

Figure 6:
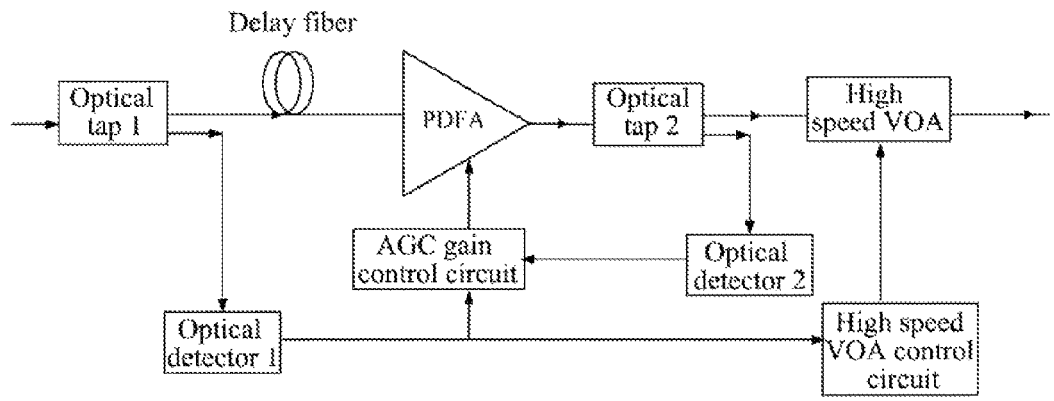
FIG. 6 is structural diagram of a composition of an apparatus for amplifying and dynamically adjusting an optical signal according to example two of the present invention.

The operational principle of the apparatus for amplifying and dynamically adjusting an optical signal illustrated in FIG. 5 will be described by example of PDFA hereinafter. As shown in FIG. 6, in the apparatus for amplifying and dynamically adjusting an optical signal according to example two of the present invention, the uplink burst optical signals sent by a plurality of ONUs first pass through an optical tap 1 to split out a small part of the optical signals in proportion and then output the small part of the optical signals to an optical detector 1, and the remainder of the optical signals reach an input end of the PDFA after passing through a section of delay fiber. The optical detector 1 outputs the obtained electric signal after photoelectrical conversion to a gain control circuit and a high speed VOA control circuit to implement two functions respectively. The electric signal is input into the gain control circuit to implement the AGC function on the PDFA; and the high speed VOA control circuit receives the electric signal and outputs the corresponding high speed VOA driving signal to the high speed VOA. The optical signals being amplified by the PDFA then pass through an optical tap 2 to split out a small part of the optical signals to an optical detector 2. The gain control circuit of the PDFA correspondingly adjusts the gain of the PDFA according to a relative size of the received signals of the optical detector 1 and the optical detector 2. The gain control circuit does not perform transient response to each optical signal, and only responds to an average optical power of the optical signals. As the number of access ONUs will influence the average optical power of the uplink signals, the APC mode is not suitable for use, and the AGC operational mode should be used. Under the AGC operation mode, no matter whether to increase or reduce the number of the ONUs, this will not influence the gain of the uplink burst optical signal of each ONU by the PDFA. Similar to the example one, in order to make the gain of the input signals with different optical powers equal, the gain control circuit should have an ASE pre-compensation function. The set gain size must at least make the minimum uplink burst optical signals also be amplified to the required peak optical power level.

Figure 7:
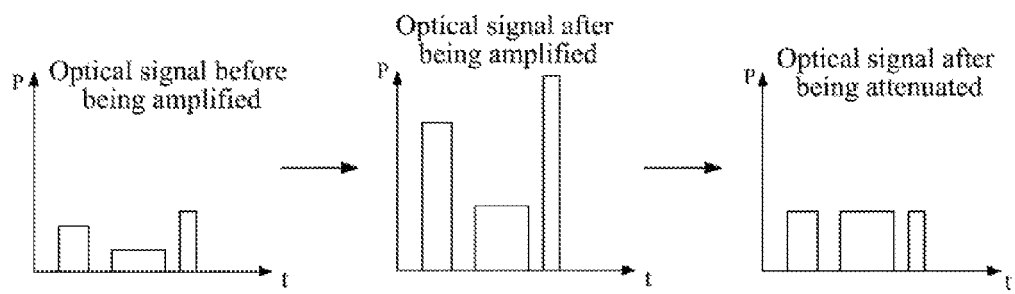
FIG. 7 is a sequential diagram of dynamic adjustment according to example two of the present invention.

A sequential chart of dynamical adjustment corresponding to example two of the present invention is shown in FIG. 7. The original difference of the peak optical powers of different ONUs also exists after being amplified in the AGC mode, but after being synchronically attenuated through the high speed VOA, the peak optical powers of the uplink burst signals of various OUNs are adjusted to the same size.

Figure 8:
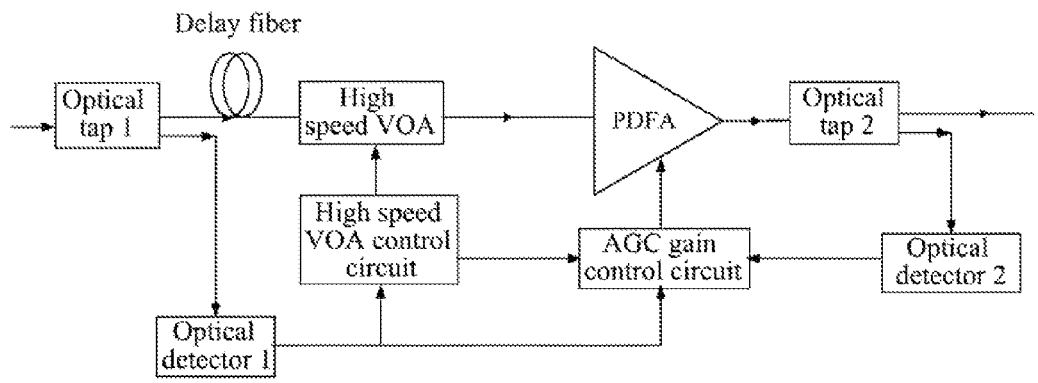
FIG. 8 is structural diagram of a composition of an apparatus for amplifying and dynamically adjusting an optical signal according to example three of the present invention.
Figure 9:
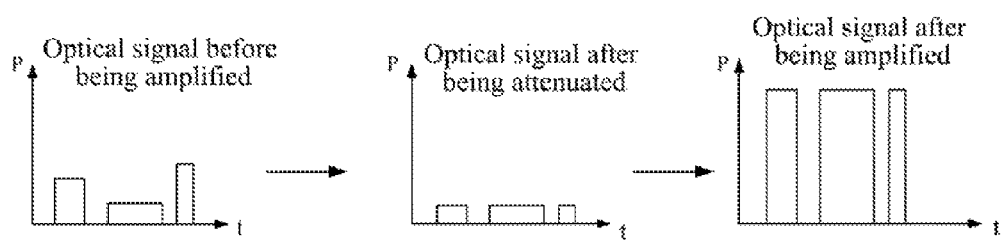
FIG. 9 is a sequential diagram of dynamic adjustment according to example three of the present invention.

In the example illustrated in FIG. 6, a high speed VOA is disposed at an output end of an optical tap 2, and it should be illustrated that the high speed VOA can also be located before the PDFA, and the corresponding example is shown in FIG. 8. The difference from the example two is that a high speed VOA is disposed between an optical tap 1 and the PDFA of the uplink, and the high speed VOA control circuit generates a corresponding high speed VOA driving signal according to an electric signal output by the optical tap 1 and outputs the high speed VOA driving signal to the high speed VOA; the high speed VOA performs attenuation on the input optical signal according to the high speed VOA driving signal and then outputs the optical signal to the PDFA. Thus, all the peak optical powers are attenuated to the same level before the uplink burst optical signals of different ONUs are input into the PDFA, and the corresponding sequential chart of dynamic adjustment is shown in FIG. 9. An AGC control is performed according to a relative size of the electric signals output by the optical detector 1 and the optical detector 2 to dynamically adjust the control signal loaded on the optical amplifier. As the high speed VOA will first perform attenuation on the input signal of the optical amplifier, the optical power detected by the optical detector 1 is not the optical power actually input into the optical amplifier, and therefore, the high speed VOA control circuit needs to output an average power adjustment amount to the gain control circuit so as to make the gain control circuit perform corresponding adjustment on the AGC control signal output to the optical amplifier. The optical amplifier dynamically adjusts the gain size according to the control signal output by the gain control circuit, so as to make the peak optical power of the output uplink burst optical signals always remain at a suitable size.

Figure 10:
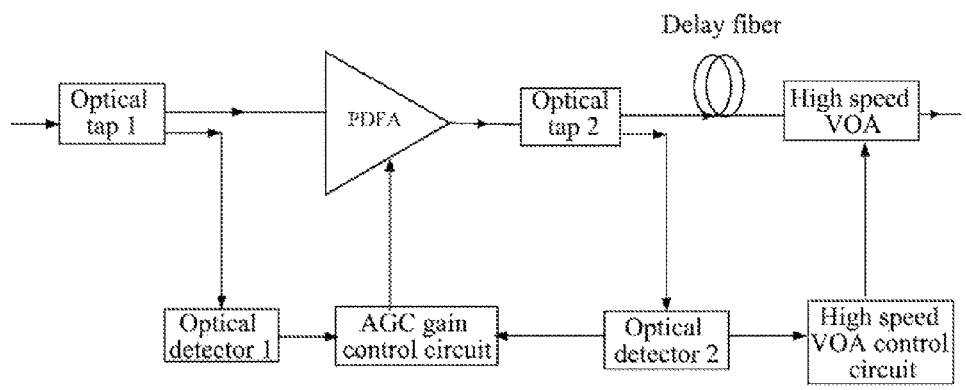
FIG. 10 is structural diagram of a composition of an apparatus for amplifying and dynamically adjusting an optical signal according to example four of the present invention.
Figure 11:
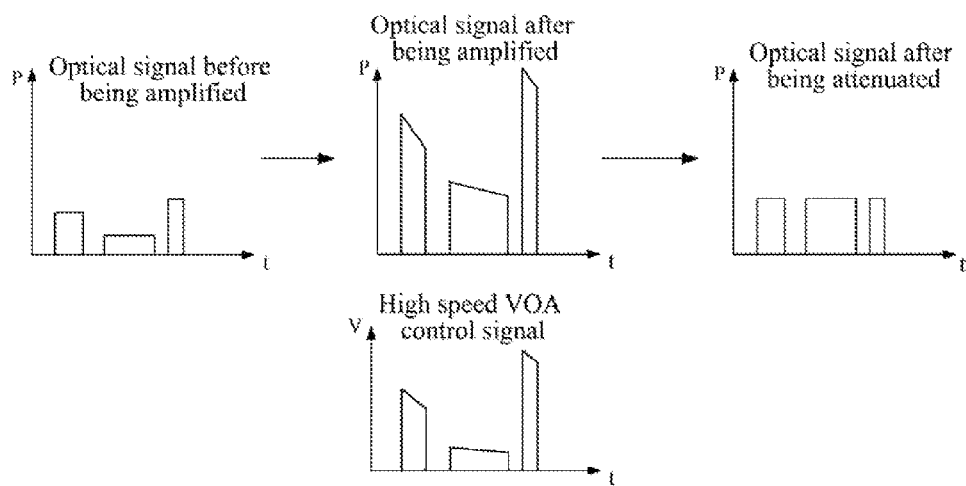
FIG. 11 is a sequential diagram of dynamic adjustment according to example four of the present invention.

As a slow response characteristic of the gain adjustment of the rare earth doped fiber amplifier, the output signal will be distorted after the burst signals are amplified in the AGC operation mode, i.e., the front edge and the back edge of the burst signals will have a peak power difference, which is caused by that energy level particles on the rare earth doped fiber which are consumed by the front edge of the burst signals can not be timely supplemented. The size of the peak power difference is related to factors such as an interval, a width of the burst signal, and a gain value of the amplifier etc. If the input signal of the high speed VOA control circuit in the example illustrated in FIG. 6 is amended as the uplink signal received by the optical detector 2, which has a distortion after being amplified, and a corresponding high speed VOA driving signal is output by the high speed VOA control circuit (the corresponding example four is shown in FIG. 10), the distortion of the uplink burst signal after being attenuated by the VOA is reduced (the corresponding sequential chart of dynamic adjustment is shown in FIG. 11).

The above description is only the preferred examples of the present invention and is not intended to limit the protection scope of the present invention.

What is claimed is:

1. A method for amplifying and dynamically adjusting an optical signal, comprising:
   in a passive optical network which comprises Optical Line Terminals (OLTs) and Optical Network Units (ONUs),
   the ONUs sending uplink optical signals which have different uplink optical powers in different uplink burst slots;
   a first optical tap, after receiving each uplink optical signal, splitting out a small part of the uplink optical signal and outputting the small part of the uplink optical signal to a first optical detector;
   the first optical detector converting the small part of the uplink optical signal into an electric signal and then outputting it to a high speed gain control circuit;
   the high speed gain control circuit dynamically adjusting and outputting control signals to an optical amplifier based on dynamically varied electric signals from the first optical detector, wherein the electric signals dynamically vary with the different uplink burst slots;
   the first optical tap outputting the remaining part of the uplink optical signal to the optical amplifier through a section of delay fiber to ensure the remaining part of the uplink optical signal and the control signal from the high speed gain control circuit reach the optical amplifier simultaneously, wherein, the optical amplifier is a Semiconductor Optical Amplifier (SOA), an operation mode of the SOA is an Automatic Power Control (APC) mode, and the APC operation mode can implement a high speed response to a burst signal;
   the optical amplifier dynamically adjusting gain values to the remaining part of uplink optical signals according to the control signals loaded from the high speed gain control circuit to make peak powers of output optical signals in different uplink burst slots equal, thereby achieving output power equalization;
   wherein a second optical tap and a second optical detector are not required for splitting out and converting the output optical signals output by the optical amplifier.

2. The method for amplifying and dynamically adjusting an optical signal according to claim 1, further comprising: the high speed gain control circuit performing Amplified Spontaneous Emission (ASE) pre-compensation on each output control signal.

3. An apparatus for amplifying and dynamically adjusting an optical signal, comprising: in a passive optical network which comprises Optical Line Terminals (OLTs) and Optical Network Units (ONUs), a first optical tap, a first optical detector, a high speed gain control circuit and an optical amplifier, wherein, the optical amplifier is a Semiconductor Optical Amplifier (SOA), and an operation mode of the SOA is an Automatic Power Control (APC) mode;
   the ONUs are configured to send uplink optical signals which have different uplink optical powers in different uplink burst slots;
   the first optical tap is configured to, after receiving each uplink optical signal, split out a small part of the uplink optical signal, and output the small part of the uplink optical signal to the first optical detector;
   the first optical detector is configured to convert the small part of the uplink optical signal into an electric signal and then output it to the high speed gain control circuit;
   the high speed gain control circuit is configured to dynamically adjust and outputting control signals to the optical amplifier based on dynamically varied electric signals from the first optical detector, wherein the electric signals dynamically vary with the different uplink burst slots;
   the first optical detector is further configured to output the remaining part of the uplink optical signal to the optical amplifier through a section of delay fiber to ensure the remaining part of the uplink optical signal and the control signal from the high speed gain control circuit reach the optical amplifier simultaneously;
   the optical amplifier is configured to dynamically adjust gain values to the remaining part of uplink optical signals according to the control signals loaded from the high speed gain control circuit to make peak powers of output optical signals in different uplink burst slots equal, thereby achieving output power equalization;
   wherein the apparatus does not require a second optical tap and a second optical detector for splitting out and converting the output optical signals output by the optical amplifier.

4. The apparatus for amplifying and dynamically adjusting an optical signal according to claim 3, wherein, the optical amplifier further comprises: a gain flatten filter, which is configured to flatten gains of the output optical signals with different wavelengths.

* * * * *